No. 744,110. PATENTED NOV. 17, 1903.
C. DE L. RICE.
GEAR CUTTING MACHINE.
APPLICATION FILED AUG. 23, 1902.
NO MODEL. 6 SHEETS—SHEET 1.

Fig. 1.

Attest:
A. N. Jesbera.
L. E. Varney.

Inventor:
Charles DeLos Rice
by Redding, Kiddle & Greeley
Attys.

No. 744,110. PATENTED NOV. 17, 1903.
C. DE L. RICE.
GEAR CUTTING MACHINE.
APPLICATION FILED AUG. 23, 1902.
NO MODEL. 6 SHEETS—SHEET 4.

Attest:
A. N. Jesbera
L. E. Varney

Inventor:
Charles DeLos Rice
by Redding, Kiddle & Greeley
Attys.

No. 744,110. PATENTED NOV. 17, 1903.
C. DE L. RICE.
GEAR CUTTING MACHINE.
APPLICATION FILED AUG. 23, 1902.
NO MODEL. 6 SHEETS—SHEET 5.

Attest:
A. W. Jesbera
L. E. Varney

Inventor:
Charles De Loi Rice
by Redding, Kiddle & Greeley
Attys.

No. 744,110. PATENTED NOV. 17, 1903.
C. DE L. RICE.
GEAR CUTTING MACHINE.
APPLICATION FILED AUG. 23, 1902.
NO MODEL. 6 SHEETS—SHEET 6.

No. 744,110. Patented November 17, 1903.

UNITED STATES PATENT OFFICE.

CHARLES DE LOS RICE, OF HARTFORD, CONNECTICUT.

GEAR-CUTTING MACHINE.

SPECIFICATION forming part of Letters Patent No. 744,110, dated November 17, 1903.

Application filed August 23, 1902. Serial No. 120,732. (No model.)

*To all whom it may concern:*

Be it known that I, CHARLES DE LOS RICE, a citizen of the United States, residing in the city of Hartford, county of Hartford, State of Connecticut, have invented certain new and useful Improvements in Gear-Cutting Machines, of which the following is a specification, reference being had to the accompanying drawings, forming a part hereof.

This invention relates to gear-cutting machines of the general character of those referred to in the specification of Letters Patent of the United States No. 627,310, granted to me June 20, 1899; and the general object of the invention is to improve gear-cutting machines of the type of the machine shown and described in said Letters Patent.

One particular object is to make the machine universal in its character—that is, to enable it to cut any gear and to make it possible to adjust the machine for cutting any particular gear readily and with such slight shifting or changing of parts as can be easily accomplished in a few minutes in any shop where the machine is placed for use.

Various other specific objects of improvement will be more particularly referred to hereinafter in connection with the description and explanation of the mechanism which is shown and described herein as an embodiment of the invention.

In general the operation of the improved machine is similar to the operation of the machine shown and described in said Letters Patent, and the qualities of rigidity and accuracy are secured by a general design or plan of parts, substantially as in the case of the machine shown and described in said Letters Patent.

For a general statement of the operation of the improved machine preliminary to an examination of its construction in detail reference may therefore be had to the specification of said Letters Patent.

In the drawings of the present case, in which the several features of improvement are illustrated, together with the old parts of the machine, in order that the nature of the present improvements may be clearly understood.

In the machine represented in the drawings the driving-wheel A on its short shaft A' and the transmitting-chain $A^2$, with its sprocket-wheels $A^3$ $A^4$, the latter on the worm-shaft $A^5$, are all arranged substantially as shown and described in the Letters Patent above mentioned. The worm-shaft $A^5$, however, engages a worm-wheel $A^6$ on the horizontal cam-shaft $A^8$, which is suitably mounted in bearings in the base of the machine. The work-lifting cam B on the cam-shaft $A^8$ likewise stands in operative relation with the carrier C, which, as before, supports the blank to be cut, and the master-tooth moves them to operative relation with the cutter and guide and permits them to have, when required, a partial revolution or swinging movement about an axis vertical to the axis of the blank, as well as a rotative movement around the axis of the blank. The general form of the carrier C is the same as before, comprising a vertical shaft supported in suitable bearings in the frame of the machine and bracket-arms to receive the bearings for the work-spindle; but some details of construction are varied slightly—as, for instance, no provision for adjusting the work-carrier vertically is made, the cutter and its driving-gears being vertically adjustable instead. Furthermore, the work-lifting cam is disposed substantially under the center of gravity of the work-carrier instead of under the vertical shaft thereof, thus securing a better distribution of weights and a considerable saving in the height of the machine. A block C', carrying a roller $C^2$ to rest upon the cam B and prevented from rotative movement by a guide or guides $C^3$, is provided at its top with a track $C^4$, upon which rests and travels a roller $C^5$, mounted in the lower bracket-arm of the carrier. Suitable bearings $C^6$ $C^7$ are provided in the upper ends of the bracket-arms for the work-spindle, one of which is provided also with a friction-shoe $C^8$ to bear on a hub which surrounds the work-spindle, as hereinafter referred to, for the purpose of preventing too-free movement of the indexing devices. The rearrangement of the machine permits a steady rest to be employed for the inner end of the work-spindle, so that the work is supported on both sides and is consequently held more rigidly. The steady-rest for the inner end of the work-spindle is shown at $C^9$ in Fig. 2.

Figure 2:
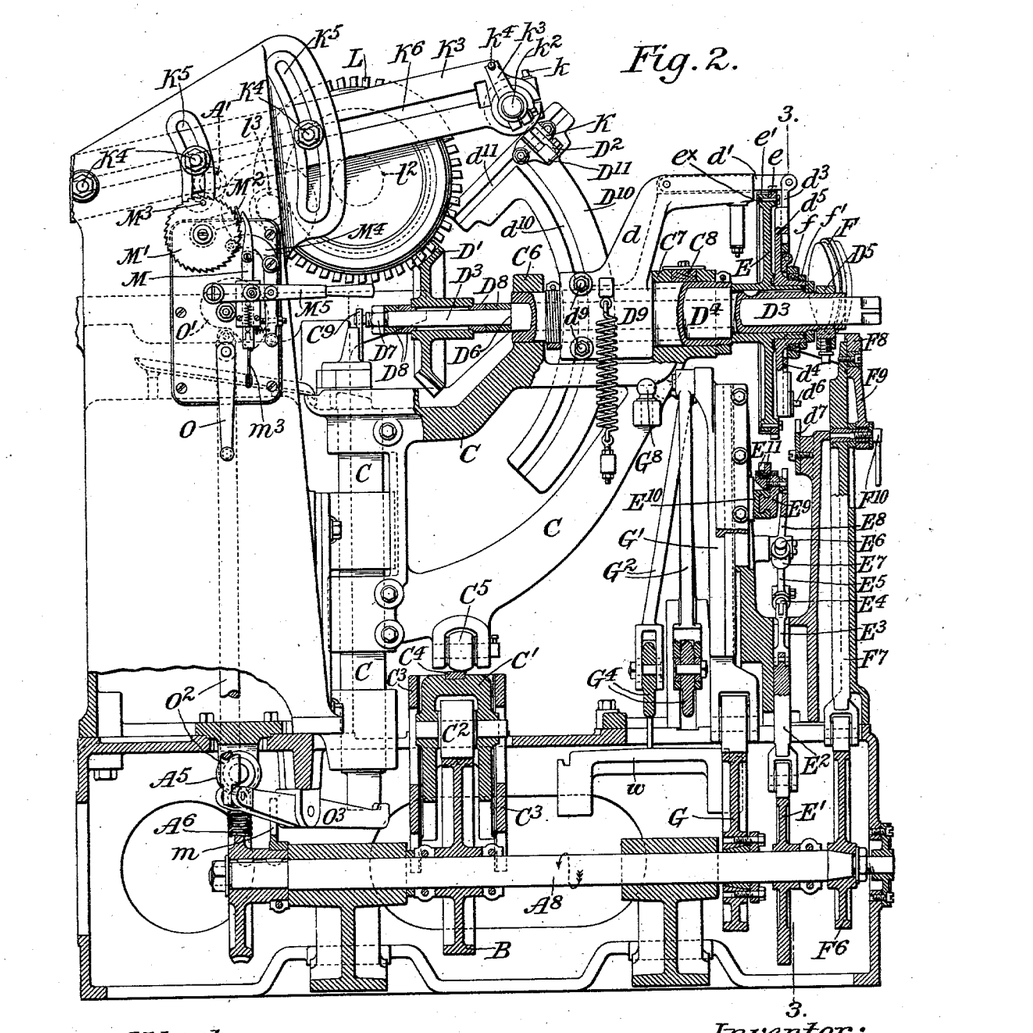
Fig. 2 is a view of the machine, partly in side elevation, as seen from the left in Fig. 1 and partly in vertical section substantially in the plane of the axis of the cam-shaft.

The work-spindle, upon which both the blank D' to be cut and the master gear-tooth or former $D^2$ are secured to move together during the cutting, comprises in the improved machine an arbor $D^3$ and a work-spindle sleeve $D^4$, which is split, in which the arbor $D^3$ is free to rotate and to move lengthwise during the positioning of the work and is secured in place after the work has been positioned by a clamp-collar $D^5$. The extreme inner end of the arbor is supported in the steady-rest $C^9$, above referred to, and that portion of the arbor between the steady-rest and the bearing of the arbor in the sleeve is of a relatively smaller diameter than the portion within the sleeve, forming a shoulder at $D^6$, while that portion of the arbor just back of the steady-rest is threaded and provided with a nut $D^7$. By loosening the clamp-collar $D^5$ and removing the nut $D^7$ it is possible to use the same arbor for a great variety of gears, suitable spacing-sleeves $D^8$ being provided to accommodate the hub of the gear which is to be cut. Furthermore, if it is necessary to change the arbor this can be done by simply withdrawing the arbor from the sleeve $D^4$ and inserting the new one without requiring the machine to be taken apart.

Figures 5, 6, 7:
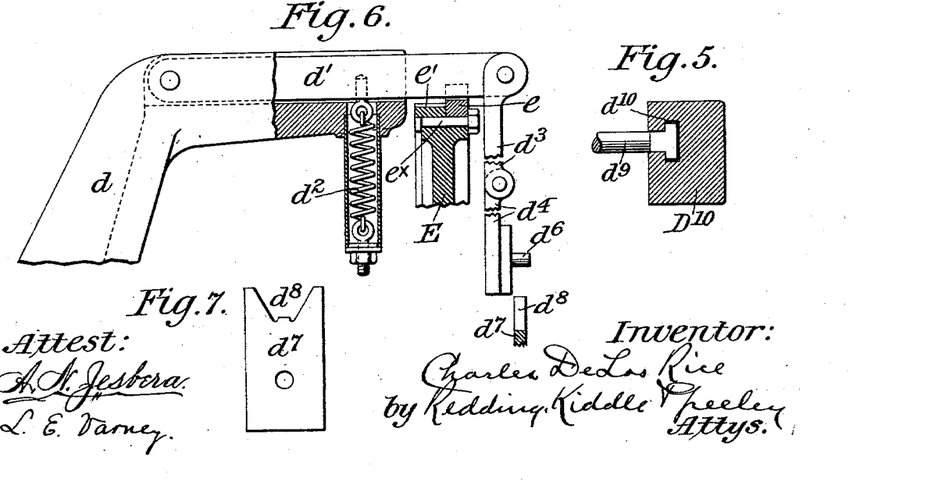
Fig. 5 is a detail sectional view on the plane indicated by the line 5 5 of Fig. 4.
Fig. 6 is a detail view, partly in elevation and partly in section, of the latch coöperating with the index-wheel, some of the parts being broken out.
Fig. 7 is a detail elevation of the stop-plate which coöperates with the latch shown in Fig. 6.

As indicated hereinbefore, the improved machine is designed with special reference to the use of a single master gear-tooth as a former, and the parts of the machine are so arranged as to make it possible to use a single master-tooth or former for a great variety of gears. During the operation of cutting, the master-tooth or tooth-former must be supported rigidly with respect to the work-spindle; but in order to permit one former to be used for a variety of gears it is evident that provision must be made for the adjustment of the tooth-former with respect to the work-spindle. To accomplish this, a hub $D^9$ is arranged to be secured rigidly on the work-spindle and to support a segment $D^{10}$, which is adjustable in a path concentric with the point of intersection of the axis of the work-spindle and the vertical axis of the work-carrier, this point also coinciding with the apex of the pitch-cone of any bevel-gear being cut. The segment is secured adjustably by bolts $d^9$ engaging a segmental T-slot $d^{10}$ in the arm $D^{10}$, as shown in Fig. 5. The head of the segment $D^{10}$ is also arranged to support a carrier $D^{11}$, which is adjustable in the T-slot $d^{11}$ of the head of the segment toward and from the center or point of intersection above referred to. The master-tooth guide-plate, as will be more particularly described hereinafter, is mounted to coöperate with the master-tooth or tooth-former $D^2$ in its various positions of adjustment, and as the character of the gear cut will depend, first, upon the selection of the tooth-former, and, second, upon the position of the tooth-former with respect to the work-spindle, it will be obvious that as the range of adjustment which is given to the segment $D^{10}$ is more than sixty degrees a great variety of bevel-gears as to pitch-cone angle can be cut upon the machine and that the size and number of teeth in such gears will be determined, in connection with the indexing mechanism, by adjusting the position of the carrier for the tooth-former in the head of the segment toward or from the center or point of intersection above referred to.

The indexing-wheel is mounted upon the work-spindle to rotate therewith and comprises a plain carrier-wheel E, which has secured upon its periphery by periphery-bolts $e^x$—that is, bolts lying in notches of the periphery of the wheel E—a notched indexing-ring $e$, the periphery of the carrier being provided with ratchet-teeth $e'$ for engagement with its actuating-pawls, as hereinafter described.

During the operation of cutting, the work-spindle must be locked to the tooth-former to move therewith, while to permit indexing, which requires a rotative movement of the blank to be cut and therefore of the work-spindle with respect to the tooth-former, it is necessary that the work-spindle be disengaged from the tooth-former. To accomplish this, the hub $D^9$, which supports the tooth-former, as above described, is provided with an arm $d$, (see Figs. 2 and 6,) in which is pivoted a latch $d'$, which is normally held by a spring $d^2$ in engagement with the notched ring $e$ of the indexing-wheel. The outer end of the latch is connected by a link $d^3$ with a slide $d^4$, which encircles the outer end of the work-spindle, and the hub of a holder $d^5$, which forms a guide for the slide $d^4$ and in which the hub of the indexing-wheel E is free to rotate. The lower end of the slide is provided with a pin $d^6$, which during the downward movement of the work-carrier in the rotation of the work-lifting cam B collides with a fixed stop $d^7$, which is shown in detail in Fig. 7, said stop having a V-notch $d^8$, which coöperates with the pin $d^6$, substantially in the same manner as does the stop $F^5$ of the machine shown and described in the Letters Patent above mentioned. The link $d^3$ is provided in the connection between the slide and the latch not only for the purpose of accommodating the swing movement of the latch, but especially for permitting the easy substitution of one indexing-ring $e$ for another, for by withdrawing either pivot-pin of the link it can be swung either up or down out of the way, so as to permit the indexing-ring to be withdrawn from its carrier when its securing-bolts are loosened.

The means for imparting to the work-spindle a rotative tendency in order to press the working face of the tooth-former against its coöperating guide and the side of the tooth against the cutter resembles in general the corresponding devices of the Letters Patent above mentioned; but there are some changes in detail. The work or master controlling weight F is shown clearly in Fig. 1 as mounted adjustably on a slotted arm $F'$, the hub $f$ of which is mounted for convenience upon the hub of the holder $d^5$, above referred to, being supported on ball-bearings and held in position by a nut $f'$. The arm $F'$ is adapted to rest upon either one of two adjustable stops $F^2$, which are provided on opposite sides of said holder $d^5$. The weighted arm is permitted to rest upon one or the other of these stops, according to the side of the tooth which is being finished, and as the holder $d^5$ during the operation of cutting is locked to the indexing-wheel and the tooth-former through the latch $d'$ it is obvious that the action of the weight will press the tooth-former against the guide-plate, the side of the tooth being cut being at the same time pressed against the cutter. To relieve the work-spindle of the action of the work-controlling weight except during the side cutting of each tooth, a cam $F^6$ is provided on the cam-shaft $A^8$, as in the machine described in said Letters Patent; but the intermediate mechanism has been improved to give it a greater range of adjustability and to enable the necessary adjustment to be effected without changing the actuating-cam. A vertically-movable plunger $F^7$ is guided in suitable ways in the frame of the machine and has at its lower end a roller to rest upon the weight-lifting cam $F^6$. At the upper end of the plunger is mounted a tilting table $F^8$, which is preferably curved to conform to the track of the weight F. An arm $F^9$, extending downwardly from the table, is slotted at its lower end to embrace a clamping-stud $F^{10}$, mounted in the plunger. Limiting-screws $F^{11}$ are mounted in the ends of the slot to determine the throw of the arm, if desired. The weight-lifting cam $F^6$ is timed, as before, with the work-lifting cam B, so that the action of the weight shall not be exerted during the rise of the work to position, the weight then resting on the table $F^8$. When the work has risen to position, the cam $F^6$ permits the table $F^8$ to descend slightly and the arm of the weight F to rest upon one stop $F^2$ or the other, as may be required, causing the work-spindle to rotate under control. By swinging the table upon its pivotal axis the elevation of that member of the table which at the time coöperates with the weight can be increased or diminished to coöperate with the weight exactly as may be required by the form of the gear being cut or otherwise without changing the weight-lifting cam.

In a machine of this character, which is practically a universal machine readily adaptable for cutting any desired gear and so arranged as to be economically useful for cutting even a single gear, it is of considerable advantage, both in point of construction and in point of adjustment for different gears, to provide for the regulation of the action of the weight by means which are readily accessible, such as the table, without requiring the substitution of a new weight-lifting cam or the building up of the periphery of the cam by supplemental pieces.

The mechanism for giving the work a lateral movement or swing in the arc of a circle about the axis in which the apex of the work-cone lies operates in somewhat the same manner as the corresponding mechanism of the former machine, but has been much simplified and improved. The work-swinging cam G is secured directly to the cam-shaft $A^8$ and coöperates directly with a heavy plunger $G'$, arranged to slide vertically in a guide formed therefor on the frame of the machine. The plunger is connected by links $G^2$ respectively with bell-crank levers $G^4$, which are mounted upon the base of the machine and may have additional weights $w$ attached, the horizontal arm of each lever being slotted, as at $G^5$, to permit of adjustment of the lower end of the link $G^2$ with respect to said arm in order that the throw of the lever may be varied as may be required by different classes of work. At the upper end of each bell-crank lever is pivoted a link $G^6$, which is provided at its inner end with a socket $G^7$, adapted to engage a corresponding ball $G^8$ on the work-carrier C. One link or the other is in engagement with the swinging work-carrier, according to the side of the tooth being cut, the other link having been disengaged by hand. The weight of the plunger $G'$, acting through the links and lever, will tend to swing the work-carrier in one direction or the other, the action of the plunger being limited and defined by the cam G. It will be obvious that any desired swinging movement of the work-carrier between the extremes may be accomplished by adjusting the links $G^2$ with respect to the slotted arms of the levers $G^4$, thereby obviating the necessity of changing or building up the work-swinging cam, as in the former machine.

Figure 10:
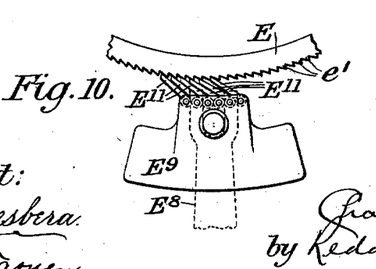
Fig. 10 is a detail of the ratchet device for operating the indexing-wheel.

The means for actuating the indexing-wheel E comprise an indexing-cam $E'$ on the cam-shaft $A^8$, said cam acting upon a vertically-movable plunger $E^2$, guided in suitable ways in the frame of the machine; but the intermediate devices are materially different from those of the former machine, having been so devised and arranged as to give a variable throw to the wheel-actuating pawl without requiring any change or building up of the indexing-cam. As shown particularly in Figs. 2 and 3, the plunger $E^2$ is connected by a link $E^3$ with one end of a lever-arm $E^4$, which is pivoted upon a suitable bracket and receives a sliding block $E^5$, the position of which upon the lever-arm may be adjusted according to the throw to be imparted to the indexing-pawl as required by the spacing of the gear to be cut. A rod $E^6$, pivoted upon the block $E^5$, slides freely through a socket-arm $E^7$ of a bell-crank lever which is pivoted upon the frame of the machine, the other arm, $E^8$, of said bell-crank lever being forked to engage a stud on the pawl-carrying block $E^9$, which is mounted to reciprocate in a segmental guide $E^{10}$, secured to the frame of the machine. As shown more clearly in Fig. 10, the block $E^9$ carries a multiple series of pawls $E^{11}$, which are so spaced as to cover a number of ratchet-teeth of the wheel E greater or less by one than the number of pawls, thereby insuring an almost immediate engagement between the pawl-block and one of the ratchet-teeth without lost motion and securing a close approach to the requirements as to rotation of the indexing-wheel, this being further perfected by the wedge-like action of the notches of the notched index-ring $e$, into which the index-latch $d'$ is forced by the spring $d^2$.

Figure 3:
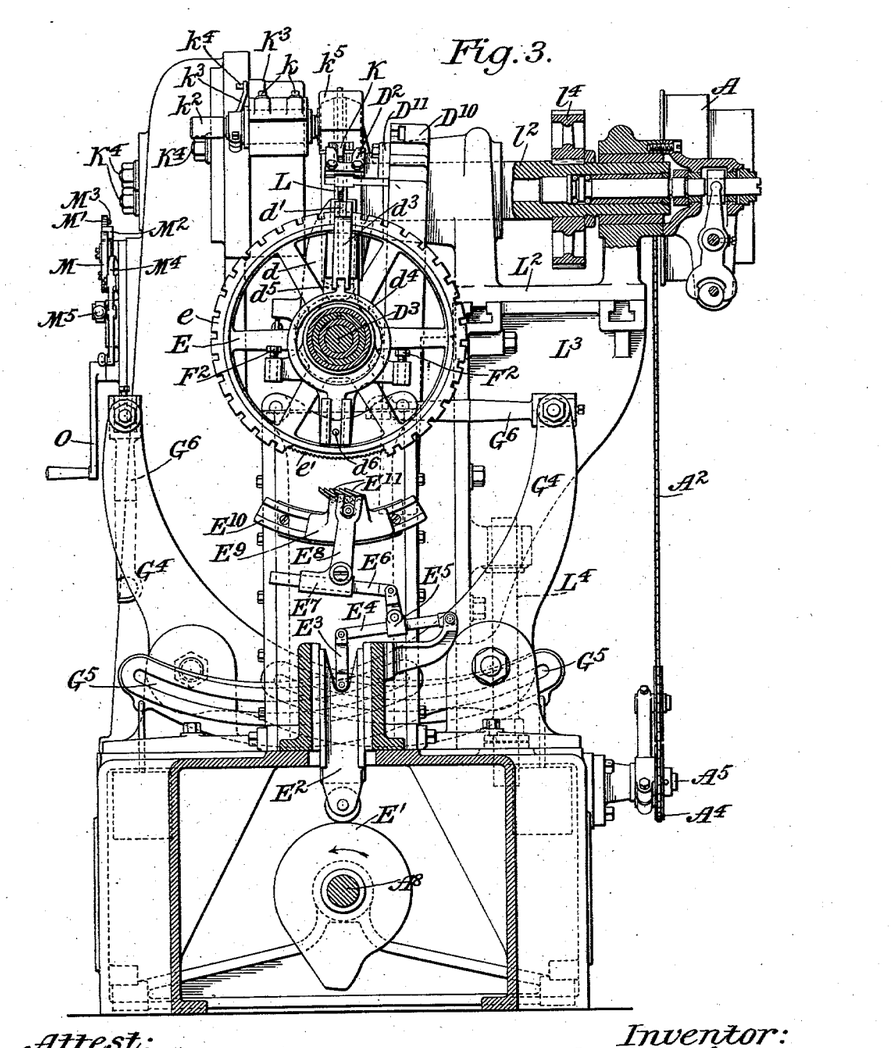
Fig. 3 is a view, partly in vertical section, on the irregular plane indicated by the dotted line 3 3 of Fig. 2, with parts in elevation and some parts of the driving mechanism broken out or shown in section.
Figure 4:
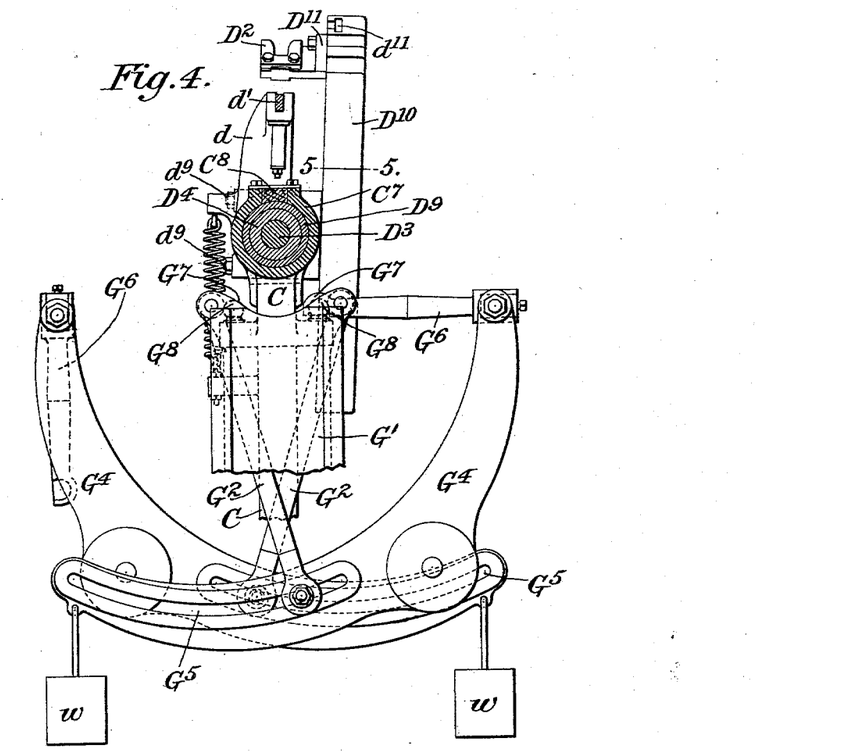
Fig. 4 is a detail elevation of parts to be referred to hereinafter, the work-arbor and some of its coöperating devices being shown in section.
Figure 12:
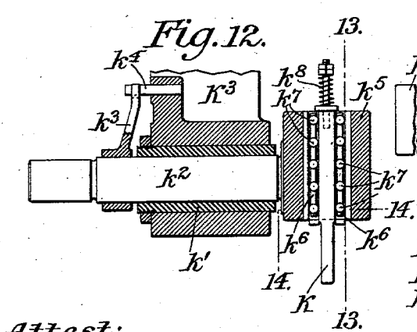
Figs. 12, 13, and 14 are detail views of the master-tooth guide-plate and its supporting devices, Figs. 13 and 14 being sections on the planes indicated, respectively, by the dotted lines 13 13 and 14 14 of Fig. 12.
Figure 13:
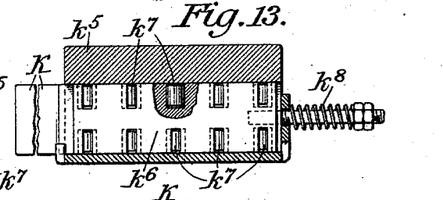
Figure 14:
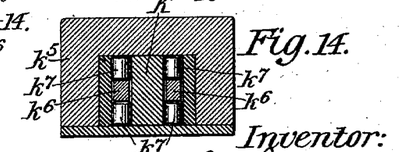

The guide K, which coöperates with the master or tooth-former during the operation of cutting, is supported substantially as in the former machine except that by reason of the greater capacity of the present machine for cutting different classes of gears the guide must have a greater range of adjustment and except also that the means for immediately supporting the guides are substantially improved, as hereinafter indicated. As shown clearly in Fig. 2, the guide K is supported by a bar $K^3$, which is held rigidly to the frame of the machine by bolts $K^4$. One of the bolts $K^4$ forms a pivot for the arm, while the other two bolts engage concentric slots $K^5$ in the frame of the machine, the heads of all three bolts entering a T-slot $K^6$ in the bar $K^3$. These provisions permit of both longitudinal and swinging movement of the bar to adjust the position of the guide K to the position of the master-tooth or tooth-former $D^2$, as determined by the adjustment of the segment $D^{10}$ and the carrier $D^{11}$. The end of the arm or bar $K^3$ is split, as shown in Figs. 2 and 3, and provided with clamping-bolts $k$ to clamp tightly a bushing $k'$, (shown in Fig. 12,) which in turn receives a spindle $k^2$. An arm $k^3$ is clamped upon the spindle $k^2$ and engages a pin $k^4$ in the arm or bar $K^3$ to determine the position of the spindle within the bushing. The end of the spindle bears a block $k^5$, within which are mounted two roll-cages $k^6$, (shown in Figs. 12, 13, and 14,) each bearing a series of rolls $k^7$. The guide-plate K is placed between the roll-cages, and its own weight is delicately counterbalanced by a spring $k^8$, applied to an extension of the guide-plate and retained by suitable nuts. The guide-plate projects from the head $k^5$ normally about as shown in Fig. 12, being held in exact position, yet easily movable between the rolls. During the movement of the master-tooth or former as the cutting of the gear-tooth proceeds the guide-plate creeps out from the head through the drag of the plate on the master-tooth or former, so that there is no wear whatever upon the master-tooth or former, and a single master-tooth having been once properly formed can therefore be used indefinitely without any change through wear. As soon as one side of a tooth has been cut and the master-tooth or former is relieved of the pressure of the work-controlling weight the guide-plate is immediately drawn back to its normal position by the spring $k^8$, the strength of which is sufficient to overbalance the weight of the guide-plate, but is not sufficient to overcome, in addition thereto, the drag of the tooth-former against the guide-plate.

Figure 11:
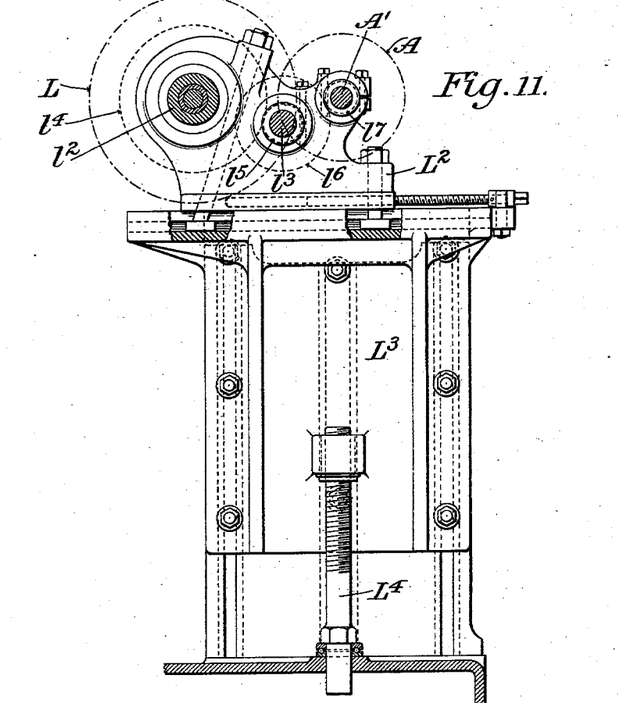
Fig. 11 is a detail view of the adjustable cutter-carrying frame, the driving-gears and cutter being indicated by dotted lines.

The cutter L is arranged and driven substantially as shown in the Letters Patent above mentioned, but is arranged to be adjusted in position vertically as well as horizontally in order to avoid the necessity for vertical adjustment of the work-carrier. As indicated in Fig. 11, the cutter L, its shaft $l^2$, the intermediate shaft $l^3$, and the driving-shaft $A'$, together with their intermeshing gears $l^4\ l^5\ l^6\ l^7$, are mounted upon a cutter-head $L^2$, which is laterally adjustable upon a cutter-carrying knee $L^3$, the latter being vertically adjustable upon the frame of the machine by means of a suitable screw $L^4$, the vertical adjustment of the cutter-carrier knee $L^3$ effecting vertical adjustment of the cutter necessary to meet the requirements of the work. The means for adjusting the cutter in the direction of its axis shown in Fig. 3 are substantially as shown and described in the Letters Patent above mentioned and need not be further described herein.

Figures 8, 9:
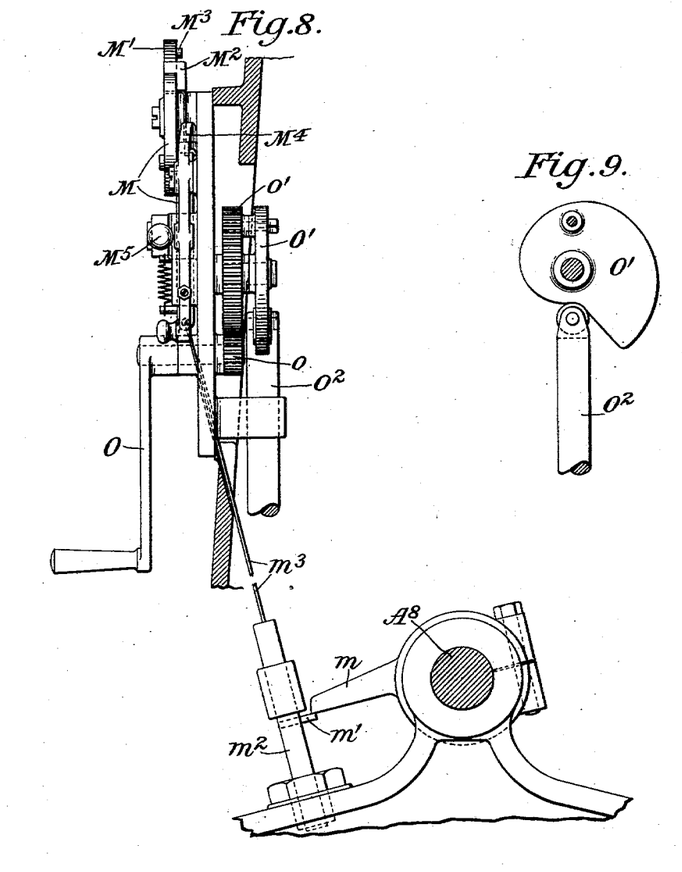
Fig. 8 is a detail view of the devices for stopping the machine at the completion of one side of every tooth of a gear, together with the devices for lifting the work-carrier.
Fig. 9 is a detail view of the cam shown in edge view in Fig. 8, showing also a portion of the cam-operated rod.

The means for stopping the machine as soon as the work has been completed on one side of every tooth of the gear being cut, as shown in Figs 2 and 8, are modified slightly to accommodate other changes in the machine and will therefore be described briefly, although the operation is substantially the same as in the former machine. A finger $m$ is clamped upon the cam-shaft $A^8$, and therefore makes a complete revolution for each tooth of the gear being cut. In its revolution it engages a pin $m'$ in a plunger $m^2$, which is suitably connected, as by wire $m^3$, with a spring-elevated pawl M, which engages a ratchet-wheel $M'$, mounted upon the frame of the machine. A shield $M^2$ is provided to insure the advance of the ratchet-wheel through one space only with each revolution of the cam-shaft $A^8$, and the ratchet-wheel is provided at the proper point with a cam-pin $M^3$, which at the completion of a revolution actuates a detent $M^4$, which in turn releases the shipper-lever $M^5$. The latter may be connected to the belt-shipping mechanism in any convenient manner. In Figs. 2, 8, and 9 is also shown a device for raising the work prior to the starting of the machine for the purpose of positioning the work exactly. This device comprises a hand-crank O, operatively connected, through gears $o$ $o'$, with a cam $O'$. The latter coöperates with a plunger $O^2$, the lower end of which engages a lever $O^3$, pivoted on the base of the machine. The other end of the lever underlies the vertical shaft of the work-carrier C, so that by rotation of the hand-crank the work-carrier can be raised to position independently of the operation of the cam-shaft $A^8$.

The operation of the improved machine herein described is substantially the same as that of the machine shown and described in the Letters Patent of the United States above mentioned, but will be briefly explained herein with especial reference to the improved features of construction. The arbor $D^3$ is partly withdrawn from the sleeve $D^4$ to receive the blank $D'$ to be cut and is then returned to position with its inner end resting upon the steady-rest $C^9$. The work-carrier C is then raised by the rotation of the crank O. The gear-blank is carefully positioned with reference to the cutter L and the guide-plate K, the tooth-former or master having been previously firmly clamped in position, and the arbor $D^3$ rigidly secured to the sleeve $D^4$ by means of the clamp-collar $D^5$, the sleeve $D^4$ being split. The work and former having been positioned, the carrier is allowed to descend to its lowest position, the shaft $A^8$ being set with the several cams B, G, E', and $F^6$, together with the finger $m$, in their initial or zero positions, while the weight F is turned to the proper side of the work-spindle, being for the time supported upon the table $F^8$, and the carrier-swinging plunger $G'$ is connected to the proper side of the work-carrier C through the engagement of one or the other of the links $G^6$ with its corresponding stud $G^8$. The guide-plate K is of course adjusted to the proper position to coöperate with the master-tooth or tooth-former $D^2$, and the cutter is properly adjusted in height. The table $F^8$ is also adjusted, if necessary. It being assumed that the proper indexing-ring is in place and that the throw of the indexing-pawls is suited to the requirements of the gear, the machine is started. The cam B raises the work-carrier, causing it at first to approach the cutter rapidly and afterward more slowly while the cutter is working to the required depth. During the rise of the work-carrier the cam $F^6$ raises the table $F^8$, which lifts the work-controlling weight F, relieving the work-spindle of any rotative action while the work is rising; but just before the work has risen to its highest position the cam $F^6$ permits the table $F^8$ to descend slightly, allowing the weight F to act through its arm $F'$ upon the one or the other of the stops $F^2$ to impart to the work-spindle a rotative tendency in the proper direction. The cam G then permits the weight or weighted plunger $G'$ to descend and to act through its connection upon the work-carrier C, causing it to swing to one side or the other to permit of side cutting of the tooth to be finished. It afterward causes the plunger $G'$ to swing the work-carrier back to its central position. As the rotation of the shaft $A^8$ continues the cam B permits the work-carrier to descend. The cam $F^6$, acting through the table $F^8$, holds the work-controlling weight from the stop $F^2$ during the descent of the work-carrier, thereby relieving the pressure against the guide-plate K. As the work-carrier descends the latch $d'$ is lifted through the collision of the pin $d^6$ with the stop $d^7$, thereby releasing the indexing-wheel, and as the work-carrier reaches its lowest position, thereby bringing the ratchet-teeth $e'$ of the indexing-wheel into operative relation with the indexing-pawls $E^{11}$, the cam $E'$ acts, through the indexing-pawls $E^{11}$, to advance the indexing-wheel one space. As the work-carrier rises again the latch drops into the next notch of the indexing-ring and perfects the position of the work-spindle. The finger $m$ on the shaft $A^8$ acts, as above described, to advance the ratchet-wheel $M'$ one space at each revolution of the shaft $A^8$, and thereby to effect the stopping of the machine as soon as one side of every tooth of the gear-blank has been cut. The weight F is then swung over to the opposite side of the work-spindle, the plunger $G'$ is connected to the opposite side of the work-carrier, the cutter is shifted laterally to effect the cutting of the opposite side of the tooth, and the guide-plate K is shifted laterally to coöperate with the opposite side of the tooth-former or master. The machine is then again started and the cutting of the other side of each tooth is proceeded with in the manner already described.

Figure 1:
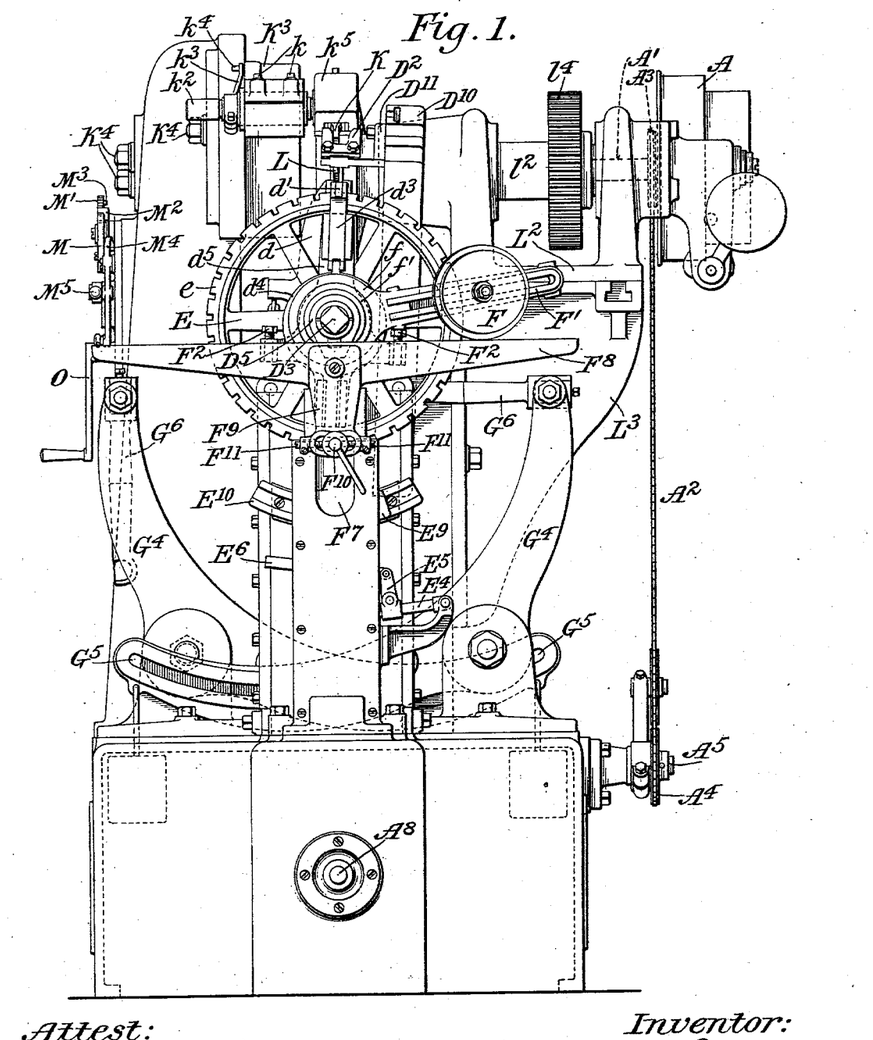
Figure 1 is a front view of the improved machine.

It will be evident that through the arrangement and relative adjustability of parts of the machine it will be possible to cut a great variety of gears without the substitution of any special parts other than the spacing-sleeves on the work-arbor which may be necessary to accommodate the hub of the gear-blank. The angle or pitch cone is determined by adjustment of the segment $D^{10}$ on the hub $D^9$, and within limits the size and number of teeth is determined, in connection with the indexing mechanism, by the adjustment of the master-tooth block $D^{11}$ in the head of the segment $D^{10}$ toward or from the apex of the work, the guide-plate K being of course adjusted in position to coöperate with the tooth-former or master. Other varieties of gears may require a change in the tooth-former or master-tooth, and still others may require a change of the indexing-ring, and in some cases a change of the work-arbor may be necessary. The stop-ratchet wheel M' may also require to be changed or to have the position of its pin $M^3$ shifted. In other words, while many different varieties of gears can be cut by simple adjustment of some parts of the machine it is possible to adapt the machine for any gear whatever without a change of more than four parts at the utmost—namely, the tooth-former or master-tooth, the indexing-ring, the arbor, and the stop-ratchet—and all of these parts can be removed and replaced readily without dismembering the machine. Furthermore, while a single master-tooth can be used for many different forms of gears there is practically no wear on the master-tooth, and a single master-tooth having been properly hardened and accurately formed is subject to no change and can be used for an indefinite time. The location of the work-lifting cam substantially beneath the center of gravity of the work-carrier permits the weights to be better distributed and saves considerable in the height of the machine, while the offsetting of the frame of the machine to one side at the top, as shown in Figs. 1 and 3, permits the carrier-arm for the guide-plate to be located at the side of the cutter instead of coming down over it from above, and thereby further reduces the height of the machine and makes it more compact. The construction of the indexing mechanism gives a wide range of adjustment and great facility in adjustment, while securing a very close approach to requirements as to spacing. The provision of a table $F^8$ to support the work-controlling weight and the adjustability of such table likewise gives great range and facility in adjustment. It is not attempted, however, to enumerate here all of the advantages in construction and operation of the machine, such advantages being obvious to those skilled in the art. Furthermore, while but a single form of machine has been shown as an embodiment of the invention it will be evident that various changes can be made without departing from the spirit of the invention.

I claim as my invention—

1. A machine for cutting gear-teeth comprising a work-carrier, a work-spindle consisting of a sleeve rotatably mounted in said carrier, and an arbor rotatable and movable longitudinally in said sleeve, indexing devices applied to said sleeve, means to secure together said sleeve and arbor, and means to secure a gear-blank to said arbor independently of such sleeve.

2. A machine for cutting gear-teeth comprising a work-carrier, a work-spindle consisting of a sleeve rotatably mounted in said carrier and an arbor mounted in said sleeve, indexing devices applied to said sleeve, a steady-rest on the carrier to support the end of the arbor, means to secure together said sleeve and arbor, and means to secure a gear-blank to said arbor independently of such sleeve.

3. A machine for cutting gear-teeth comprising a work-carrier, a work-spindle consisting of a sleeve rotatably mounted in said carrier and an arbor mounted in said sleeve and having its inner portion reduced to form a shoulder and adapted to receive a gear-blank, indexing devices applied to said sleeve, means to secure together said sleeve and arbor, and means to secure a gear-blank on the reduced portion of said arbor independently of said sleeve.

4. A machine for cutting gear-teeth comprising a swinging work-carrier having a vertical shaft and bracket-arms, a work-spindle mounted in said carrier, a work-lifting cam coöperating with said work-carrier and located substantially beneath the center of gravity of the work-carrier and independent means acting at the lower end of the shaft of the work-carrier to raise the work-carrier.

5. A machine for cutting gear-teeth comprising a swinging work-carrier having a vertical shaft and bracket-arms, a work-spindle mounted on said work-carrier, a roller mounted in the under side of one of said bracket-arms substantially beneath the center of gravity of the carrier, a work-lifting cam, and a block coöperating with said cam and having a track to receive said roller.

6. A machine for cutting gear-teeth comprising a work-carrier mounted to swing in a horizontal plane, a work-supporting spindle mounted rotatably on said work-carrier, a relatively fixed guide, a master-tooth to coöperate with said guide, a slotted arm supporting said master-tooth, and means coacting with the slot in said arm to secure said arm adjustably to the work-carrier to permit of adjustment of the master-tooth with respect to the work-carrier.

7. A machine for cutting gear-teeth comprising a work-carrier mounted to swing in a horizontal plane, a work-supporting spindle mounted rotatably on said carrier, a segment-arm concentric with the intersection of the axes of movement of the work-carrier and the blank-supporting means, means to secure said arm adjustably to said carrier, a relatively fixed guide and a master-tooth mounted on said arm to coöperate with said guide.

8. A machine for cutting gear-teeth comprising a work-carrier mounted to swing in a substantially horizontal plane, a substantially vertical cutter, means to support a gear-blank on said work-carrier in lateral contact with the cutter, an arm mounted upon the work-carrier and having a head out of the horizontal plane of movement of the work, a block adjustable on said head toward and from the intersection of the axes of movement of the work-carrier and the blank-supporting means, a guide and a master-tooth mounted on said block for lateral contact with the guide.

9. A machine for cutting gear-teeth comprising a work-carrier mounted to swing in a substantially horizontal plane, a vertical cutter, means to support a gear-blank on said carrier in lateral contact with the cutter, a segment-arm mounted adjustably on said work-carrier and having a head out of the horizontal plane of movement of the work elongated in the direction of the intersection of the axes of movement of the work-carrier and the blank-supporting means, a block adjustable on said head toward and from the intersection of said axes, a guide and a master-tooth mounted on said block for lateral contact with the guide.

10. A machine for cutting gear-teeth comprising a work-carrier mounted to swing in a substantially horizontal plane, a substantially vertical cutter, means for supporting a gear-blank on said work-carrier in lateral contact with the cutter, an arm mounted on said work-carrier and adjustable with reference to the intersection of the axes of movement of the work-carrier and the blank-supporting means, a master-tooth mounted on said arm, out of the horizontal plane of movement of the work for lateral contact with the guide-plate, a guide-plate to coöperate with said master-tooth, and an arm supporting said guide-plate and adjustable to accommodate the adjustment of the master-tooth.

11. A machine for cutting gear-teeth comprising a master-tooth guide-plate, a head to support said plate and having roller-bearings therefor, and a spring to balance the weight of said plate.

12. A machine for cutting gear-teeth comprising a master-tooth guide-plate, a head, a support for said plate, roll-cages and rolls interposed between said plate and head, and a spring to balance the weight of the plate.

13. A machine for cutting gear-teeth comprising a work-carrier, a master-tooth mounted on said work-carrier, a master-tooth guide-plate and means for supporting said plate movably and yieldingly whereby the plate moves with the drag of the master-tooth.

14. A machine for cutting gear-teeth comprising a work-carrier, means to move the same toward and from the work, a work-spindle mounted on said work-carrier, a hub mounted on said work-spindle, a master-tooth supported from said hub, a latch also supported from said hub, an indexing-wheel mounted on said spindle and having notches to be engaged by said latch, a relatively fixed stop and devices intermediate the latch and the stop whereby the latch is disengaged from the indexing-wheel when the work-carrier moves away from the cutter.

15. A machine for cutting gear-teeth comprising a work-carrier, means to raise and lower said work-carrier, a work-spindle mounted on said work-carrier, a hub mounted on said work-spindle, a master-tooth supported from said hub, a latch also supported from said hub, an indexing-wheel mounted on the work-spindle and having notches to be engaged by said latch, a slide connected to said latch, and a fixed stop to coöperate with said slide and release the latch as the work-carrier descends.

16. A machine for cutting gear-teeth comprising a work-carrier, a work-spindle, a hub mounted on said spindle and supporting a master-tooth and a latch, an indexing-wheel mounted on said spindle and having a detachable indexing-ring, a slide carried by said work-spindle to lift the latch, and a link connecting said latch and slide.

17. A machine for cutting gear-teeth comprising a work-carrier, a work-spindle, a master-tooth and a latch connected together and mounted on the work-carrier, and an indexing-wheel mounted on the spindle and comprising a carrying-wheel and an independent index-ring provided with notches for engagement by the latch, and detachably secured to said carrying-wheel.

18. A machine for cutting gear-teeth comprising a work-spindle, an indexing-wheel mounted thereon, a lever-arm, means to oscillate said lever-arm, a slide adjustable on said lever-arm, a rod pivoted to said slide, and a pawl-actuating lever having a socket to engage said rod.

19. A machine for cutting gear-teeth comprising a work-spindle, an indexing-wheel mounted thereon, a segmental guide mounted in proximity to said wheel, a pawl-carrying block mounted to oscillate in said guide, a lever having one arm formed to engage said block and having the other arm formed with a socket, a rod engaging said socket, a slide to which said rod is pivoted, an oscillating lever-arm upon which said slide is adjustably mounted, and means to oscillate said lever-arm.

20. A machine for cutting gear-teeth comprising a laterally-movable work-spindle, a weighted arm moving with said spindle, a stop connected with said work-spindle and arranged to receive the weight of said arm, an extended table curved to conform to the track of the weighted arm and upon which the weight may rest at any point in its lateral movement with the work-spindle, and means to raise and lower said table.

21. A machine for cutting gear-teeth comprising a laterally-movable work-spindle, a weighted arm moving with said work-spindle, a stop connected with said work-spindle and arranged to receive the weight of said arm, a plunger and means to raise and lower the same, and a tilting table mounted on said plunger and supporting the weight of said arm.

22. A machine for cutting gear-teeth comprising a laterally-movable work-spindle, a weighted arm moving with said work-spindle, a stop connected to said spindle and arranged to receive the weight of said arm, a plunger and means to raise and lower the plunger, a tilting table mounted upon said plunger and having a slotted arm, and a clamping-stud on the plunger adapted to engage said slotted arm.

23. A machine for cutting gear-teeth comprising a laterally-movable work-spindle, a weighted arm moving with said spindle, a stop connected with said spindle and arranged to receive the weight of said arm, a plunger and means to raise and lower the plunger, a tilting table mounted on said plunger and arranged to receive the weight of the arm and having a slotted arm, a clamping-stud mounted on said plunger and engaging said slotted arm, and limiting-screws oppositely carried by said arm and adapted to coöperate with said clamping-stud.

24. A machine for cutting gear-teeth comprising a laterally-movable work-carrier, a weighted plunger, a cam to coöperate with said plunger, a bell-crank lever, a link connecting one arm of said bell-crank lever with said plunger, and a second link connecting the other arm of said bell-crank lever with said work-carrier.

25. A machine for cutting gear-teeth comprising a laterally-movable work-carrier, a weighted plunger, a cam to coöperate with said plunger, a bell-crank lever having a slotted arm, a link having one end connected to said plunger and having the other end adjustably connected to said slotted arm, and a second link connecting the other arm of the bell-crank lever with said work-carrier.

This specification signed and witnessed this 21st day of August, A. D. 1902.

CHARLES DE LOS RICE.

In presence of—
W. M. BYORKMAN,
ED. S. McALL.